United States Patent [19]

Schön et al.

[11] 4,402,592
[45] Sep. 6, 1983

[54] MECHANISM FOR TRANSPORTING PRINTING PLATES

[75] Inventors: Klaus-Peter Schön, Wiesbaden; Günter Back, Diedenbergen, both of Fed. Rep. of Germany

[73] Assignee: Hoechst Aktiengesellschaft, Frankfurt am Main, Fed. Rep. of Germany

[21] Appl. No.: 250,124

[22] Filed: Apr. 2, 1981

[30] Foreign Application Priority Data

Apr. 2, 1980 [DE] Fed. Rep. of Germany ....... 3012815

[51] Int. Cl.³ .................... G03G 15/00; G03G 15/22
[52] U.S. Cl. .................................. 355/3 R; 271/104; 271/107; 355/3 SH; 355/73
[58] Field of Search ..................... 355/3 R, 3 SH, 73; 271/102, 104, 107

[56] References Cited

U.S. PATENT DOCUMENTS

| | | | |
|---|---|---|---|
| 3,040,621 | 6/1962 | Crumrine | 355/73 X |
| 3,411,640 | 11/1968 | Wallis | 271/104 X |
| 3,575,409 | 4/1971 | Calvert | 271/102 X |
| 3,866,764 | 2/1975 | Leiser | 271/104 X |
| 4,003,567 | 1/1977 | Berger et al. | 271/104 X |
| 4,006,984 | 2/1977 | Friese | 355/73 X |
| 4,082,455 | 4/1978 | Brigham | 355/73 X |
| 4,149,798 | 4/1979 | McGowan et al. | 355/3 R X |

Primary Examiner—Fred L. Braun
Attorney, Agent, or Firm—Schwartz, Jeffery, Schwaab, Mack, Blumenthal & Koch

[57] ABSTRACT

A mechanism for transporting printing plates includes a swiveling lifting cylinder carrying on its extendable and retractable piston rod a dish-shaped plate which is equipped with suction elements. The printing plates are stacked in inclined positions in a plate holder. When so stacked, the coated, photoconductive sides of the printing plates face downwards and are protected from damage by sheets. For transporting a printing plate to an exposure table, the dish-shaped plate of the lifting cylinder is lowered onto the uncoated side of the printing plate which lies on top of the stack in the plate holder until the suction elements rest on the printing plate. Then, reduced pressure is applied to the suction elements so that they grip the printing plate by suction, and the piston rod is partially retracted into the lifting cylinder. Then the lifting cylinder swivels to a vertical position and places the now horizontally lying printing plate on a conveyor track where it is engaged by rollers and is further transported, after the reduced pressure of the suction elements has been released.

6 Claims, 1 Drawing Figure

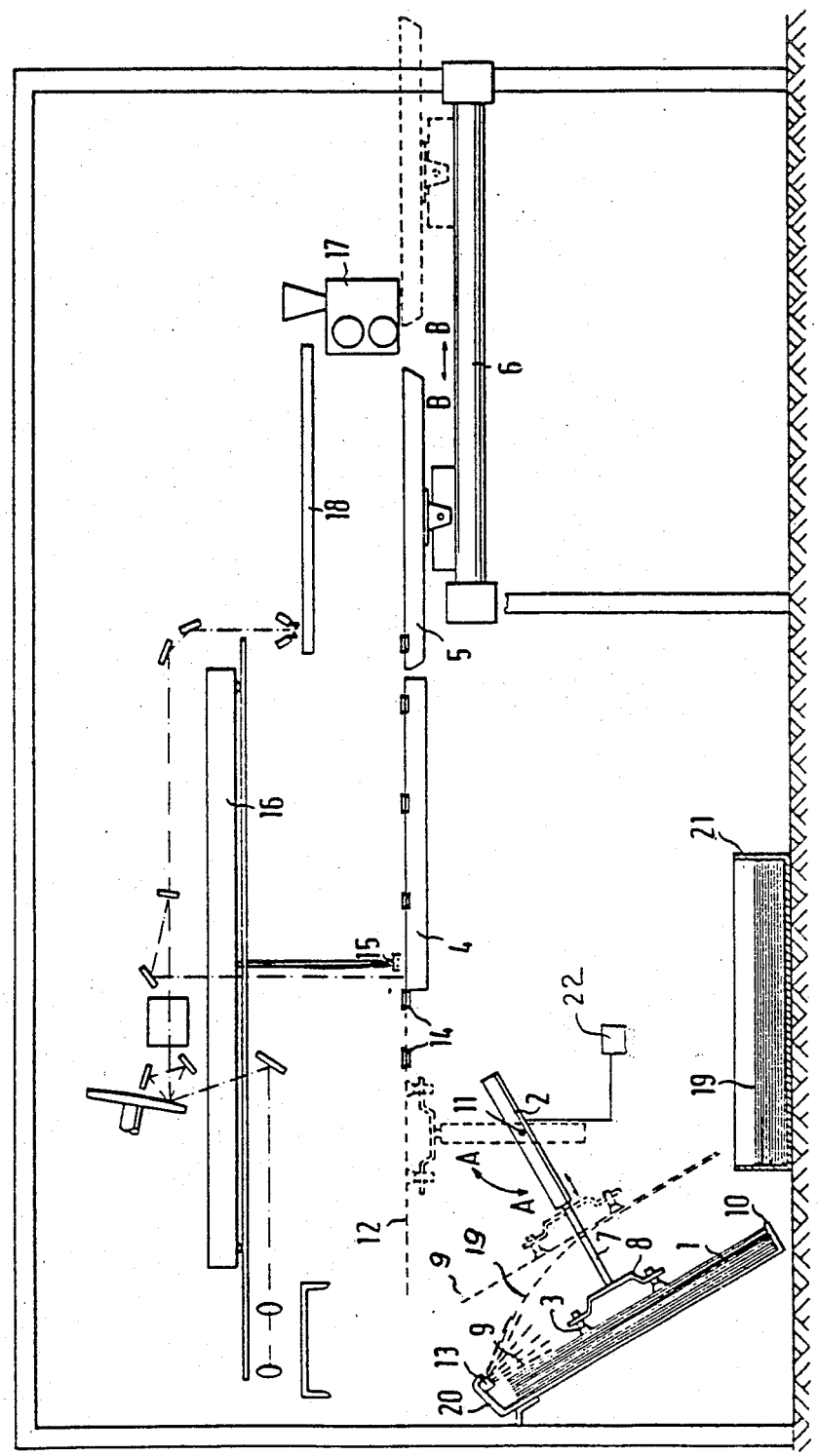

MECHANISM FOR TRANSPORTING PRINTING PLATES

BACKGROUND OF THE INVENTION

1. Technical Field of the Disclosure

The present invention relates to a mechanism for transporting printing plates from a magazine or plate holder, in which the plates are stacked, to an exposure station with the aid of suction air.

2. Description of the Prior Art

Lettered and imaged printing masters which are directly suitable for printing are manufactured in such a way that the printing plates are first electrostatically charged and that an original is then projected imagewise upon the individual plate. After this exposing procedure, the printing master is developed with a developer, fixed and decoated and is then ready for printing.

U.S. Pat. No. 4,006,984 discloses an apparatus for the manufacture of printing masters by electrophotographic means, in which the individual printing plate is picked up from a stack in a plate holder by a transport device comprised of a transport carriage with a reduced pressure-suction means. The transport carriage transfers the printing plate to an exposure platform. Charging of the individual printing plate and transporting it to the exposure station are combined in a time-saving manner by mounting at the front of the transport carriage a corona charging-station for the electrostatic charging of the printing plates. The corona charging-station extends transversely to the direction of motion of the carriage. The carriage runs on two guide rails and is driven by a motor positioned on top of it. The carriage engages via a gear wheel with a rack-and-pinion gear which is arranged parallel to the direction of motion of the transport carriage. The transport carriage has a vacuum plate which is attached to its underside and which is, by a number of holes, connected with a vacuum pump. When the transport carriage is placed upon the upper side of the printing plate which lies on top in the plate holder, reduced pressure is generated and the printing plate is sucked to the vacuum plate. The transport carriage is then displaced in the direction of the exposure platform by means of the motor. As soon as the carriage has reached its position above the exposure platform, it is lowered. The vacuum is then released so that the printing plate is set free and is deposited on the exposure platform. The exposure platform is also designed as a vacuum plate; and, under the action of reduced pressure, the printing plate is firmly urged against the platform.

In this known apparatus, the printing plates are stacked in the plate holder with their photoconductive layer facing upwards. The coated side is thus sucked to the vacuum plate of the transport carriage. When a fresh supply of printing plates is placed into the plate holder or when the apparatus is opened, the printing plates which are still contained in the plate holder may be prematurely exposed by the light which falls in. As a result, the printing quality of the ready-developed master may be impaired. When the individual printing plate is removed from the stack, the photoconductive, coated side of the plate is contacted by suction means. Although these suction means allow a far gentler transport of the printing plate as compared with the rollers or webs in known apparatuses, mechanical or physical defects on the developed printing master cannot be precluded.

In U.S. Pat. No. 4,149,798, a transport station for printing masters is described which includes a stacking area containing a supply of printing masters. A paper disposal area is provided for the sheets of paper which are interposed between the individual masters in the stack. By means of a control mechanism equipped with a number of suction cups, the printing masters are transported from the stacking area to a conveyor. The control mechanism is pivotally attached to a support arm which is connected to a motor via a gear mechanism. Thus, the control mechanism is adapted to perform a lateral sliding movement back and forth. The uppermost printing plate in the stack is picked up by at least four suction cups of the control mechanism. Then the control mechanism swings upwards; and, at the same time, the support arm mechanically approaches the conveyor. When the vacuum in the suction cups is released, the control mechanism pivots downwards and deposits the printing master on the conveyor. A second control mechanism positioned above the paper separation sheet engages the sheet, picks it up and conveys it to the paper disposal area.

The conveyor transports the printing master to an exposure platform which has a plurality of holes on its upper surface and which comprises a lower chamber connected to a vacuum pump by a vacuum line. After the printing master has adopted the correct position on the surface of the exposure platform, a vacuum is applied; and the master is thus securely retained on the platform. The exposure system used to expose the printing master comprises a movable carriage to which a corona charging device and a light reflecting mirror are attached. A laser which emits modulated laser light is arranged in such a way that the light scan emitted by the laser is deflected by the mirror and impinges upon the printing master retained on the exposure platform in a plane which is approximately perpendicular to the surface of the master.

Also, in this case, the printing masters are stacked in a magazine with their coated, photoconductive sides facing upwards. It may, therefore, happen that the master lying on top is prematurely exposed when the apparatus is opened or when the stack is replenished. In the subsequent exposure and development of the printing master, this may have a negative effect on the quality of the master which is ready for printing. Just as in the first-mentioned prior art apparatus, the photoconductive layer of the printing master is contacted by suction means when the topmost printing plate is removed from the stack. Again, this may lead to mechanical or physical defects on the finished printing master.

SUMMARY OF THE INVENTION

It is, therefore, an object of the present invention to improve a mechanism of the aforementioned kind in such a way that the coated, photoconductive side of the printing plate is not mechanically contacted during transport from the plate holder to the exposure platform and is, to a large extent, protected from premature exposure.

According to the invention, this object is achieved by a mechanism of the kind described above, which has a swiveling lifting cylinder equipped with a piston rod which may be extended from and retracted into the lifting cylinder and which carries a dish-shaped plate for gripping by suction and depositing the uppermost printing plate in a stack of printing plates, the lifting cylinder being adapted to swivel about a pivotal point between a receiving position and a depositing position of the printing plate.

In a preferred embodiment of the invention, the dish-shaped plate is provided with suction elements for gripping by suction, retaining, and depositing the printing plate on a horizontal conveyor track. This conveyor track may be a table. The printing plate is transported along this table to an exposure table arranged behind the track. The plate holder or magazine is arranged in an inclined position with respect to the perpendicular (i.e., the vertical) and the lifting cylinder, in its receiving position, points perpendicularly to the uncoated side of the uppermost printing plate. At the same time, the dish-shaped plate extends parallel to the uncoated side of the printing plate and is placed upon the plate in order to pick it up from the stack.

To reiterate in somewhat different terms, the present invention provides a mechanism for transporting printing plates from a stack of plates in a plate holder to an exposure station with the aid of suction, the stack of printing plates including an uppermost printing plate. The mechanism includes a swivelable lifting cylinder and a piston rod coupled with the lifting cylinder. The piston rod is extensible from and retractable into the lifting cylinder. The mechanism includes means for selectively gripping by suction the uppermost printing plate in the stack of printing plates and for depositing that printing plate elsewhere. The selective gripping means includes a dish-shaped plate carried by the piston rod. The mechanism also includes means for accommodating swiveling movement of the lifting cylinder between a receiving position in which the uppermost plate is gripped by the selective gripping means and a depositing position in which that same printing plate is deposited elsewhere.

A horizontal conveyor track cooperates with the lifting cylinder to receive printing plates which have been swivelably moved into the depositing position. The selective gripping means may be means for gripping by suction, retaining and depositing the uppermost printing plate on the horizontal conveyor track. This selective gripping means includes suction elements on the dish-shaped plate.

Each printing plate includes an uncoated side. The horizontal conveyor track defines a vertical direction which is perpendicular to the conveyor track, and the plate holder is disposed in an inclined position with respect to this vertical direction. The lifting cylinder, when in the receiving position, points to the uncoated side of the uppermost printing plate and is disposed generally perpendicularly to the uppermost printing plate. The dish-shaped plate extends in parallel relationship to the uncoated side of the uppermost printing plate when the lifting cylinder is in the receiving position. Thus, the dish-shaped plate may be placed on the printing plate to pick it up from the stack of plates.

The plate holder includes an upper end and a lower end, the upper end being disposed vertically above the lower end. Each printing plate has a coated side opposite the uncoated side. The coated side includes a photoconductive layer. Each printing plate has a protective sheet on the coated side to protect the coated side from damage. The mechanism includes an air jet at the upper end of the plate holder, the air jet cooperating with the lifting cylinder and being so disposed as to direct a stream of air almost tangentially with respect to the photoconductive layer on the coated side of the uppermost printing plate as soon as the lifting cylinder picks up the uppermost printing plate from the stack. Thus, the air jet contributes to detachment of the protective sheet from the coated side of the printing plate.

The means for accommodating the swiveling movement of the lifting cylinder includes means for effecting movement through an angle of greater than 90° between the receiving position of the lifting cylinder, in which the uppermost printing plate is inclined with respect to the vertical direction, and the depositing position, in which position the printing plate is horizontally disposed for deposit on the horizontal conveyor track.

The horizontal conveyor cooperates with an exposure table to which printing plates are transported by rollers. The exposure table is disposed at a certain level which is vertically above the lifting cylinder at least when the lifting cylinder is in the receiving position. Thus, the exposure table and the lifting cylinder together define an upward direction. In the depositing position of the lifting cylinder, the dish-shaped plate of the lifting cylinder extends horizontally. Specifically, in the depositing position, the photoconductive layer of that particular printing plate which is retained by the suction elements faces in the upward direction and the uncoated side of the printing plate is at the same level as the exposure table.

The horizontal conveyor track is, of course, located generally in a horizontal plane. The aforementioned rollers are grooved rollers, and each printing plate includes opposite longitudinal edges. The grooved rollers are positioned in the plane of the conveyor track and engage by their grooves the opposite longitudinal edges of the printing plate during transport of the printing plate to the exposure table.

It is an advantage of the present invention that the printing master, for example a printing plate, lying in the stack of plates with its photoconductive, coated side facing downwards, is, with the aid of the rotatable swiveling or lifting cylinder, gripped by suction exerted on its uncoated side, is then turned to adopt a horizontal position with its coated side facing upwards and is, in this position, transported to the exposure table. It is thus ensured that the photoconductive layer of the printing plate is neither mechanically contacted nor prematurely exposed during the entire transport from the plate holder to the exposure platform.

BRIEF DESCRIPTION OF THE DRAWING

One embodiment of the invention is now described in detail by reference to the accompanying drawing.

The single FIGURE shows in a diagrammatic representation different processing stations of an apparatus for the reproduction of an original on the photoconductive surface of a printing plate.

DETAILED DESCRIPTION OF THE PREFERRED EMBODIMENT

A transport station for the printing plates 9 includes a swiveling lifting cylinder 2 equipped with a piston rod 7 which may be extended from and retracted into the lifting cylinder. The printing plates 9 are stacked in a plate holder 10 in such a manner that each individual printing plate within the stack 1 is positioned with its photoconductive, coated side facing downwards. These sides of the plates, i.e., the undersides, are protected by a sheet 19 consisting of paper, plastic, film or similar material, so that any two plates 9 in the stack are separated by a sheet. At its end projecting from the lifting cylinder 2, the piston rod 7 carries a dish-shaped plate 8 to which several suction elements 3 are attached. The lifting cylinder is adapted to swivel about a pivotal point 11, from an oblique position to a vertical position, as indicated by the double arrow A—A.

The plate holder 10 is arranged in inclined position with respect to the vertical. At the upper end of the plate holder 10, an air jet 13 is fixed to a bent support arm 20. The air jet 13 is adjusted in such a way that its air stream is almost tangentially directed to the underside of the printing plate 9 when the lifting cylinder 2 picks up the printing plate from the stack 1. The lifting cylinder 2, when in its receiving position (i.e., the position shown in solid lines), has been swiveled about the pivotal point 11 so that it points vertically to the uncoated side of the uppermost printing plate 9 of the stack 1. In the receiving position, the dish-shaped plate 8 extends parallel to the uncoated side of the printing plate 9 and is placed upon the printing plate. Then, reduced pressure is applied to the suction elements 3 so that they adhere to and retain the printing plate 9. The piston rod 7 is then partially retracted into the lifting cylinder until the printing plate 9 has adopted a position parallel to the plates 9 in the stack, which is indicated by a broken line in the drawing. In this position, the air stream from the air jet 13, which is almost tangentially directed to the photoconductive layer on the underside of the printing plate 9, has detached the greatest part of the sheet 19 (which sheet is for protecting the coated side of the printing plate from damage). The sheet 19, usually a sheet of paper, is blown by the air stream into a receiving tray 21 positioned below the exposure table 4. Then, the lifting cylinder 2 is swiveled (via a power source shown schematically at 22) about the pivotal point 11 into its vertical depositing position so that the printing plate 9 is moved into the plane of a conveyor track 12.

The swiveling angle of the lifting cylinder 2, between the inclined receiving position of the printing plate 9 in the plate holder 10 and the horizontal depositing position on the conveyor track 12, is greater than 90° and ranges usually between 120° and 150°.

Rollers 14 provided with grooves are arranged in the plane of the conveyor track 12. These rollers engage by their grooves the opposite longitudinal edges of the printing plate 9. As soon as the reduced pressure in the suction elements 3 is released, the printing plate 9 is set free and is transported by the driven rollers 14 along the conveyor track 12 towards the exposure table 4. On the exposure table 4, the printing plate 9 lies on a vacuum plate. As soon as the printing plate has adopted the correct position on the table, it is firmly retained thereon by creating a vacuum.

A horizontally displaceable exposure carriage 16 is situated above the exposure table 4 and is equipped with optical means for scanning an original 18 and exposing the printing plate 9. Since these processing stations comprise devices which are known in the art, they are not described in further detail.

A corona 15 is fastened to the underside of the exposure carriage 16. When the exposure carriage is horizontally displaced, the printing plate 9 is charged by the corona and is subsequently exposed. After exposure, the printing plate 9 is further conveyed to a developing table 5 by the rollers 14. The developing table 5 is connected to a drive shaft 6 arranged below the table. The developing table 5 can be horizontally moved forward and backward along this drive shaft in the direction of the double arrow B—B. Via a developing unit 17 which is positioned above the developing table, a developer coat, composed of a mixture of carrier particles and toner, is applied to the surface of the printing plate by a magnetic brush, while the printing plate 9 is guided underneath the developing unit 17. The developed printing plate is then transported into a fixing device (not shown) where the toner in imagewise distribution is fixed, i.e., it is fused to the printing plate surface by the action of radiant heat. From the fixing station, the imaged printing master is taken to a decoating station for the removal of the image areas on the photoconductive layer and is subsequently suitable for use in an offset printing press.

What is claimed is:

1. A mechanism for transporting printing plates from an inclined stack of plates in a plate holder to an exposure station with the aid of suction, the mechanism comprising:
    a swivelable lifting cylinder;
    an air jet cooperating with said lifting cylinder;
    a piston rod coupled with said lifting cylinder, said piston rod being extensible from and retractable into said lifting cylinder;
    means for selectively gripping by suction an uppermost printing plate in the stack of printing plates and for depositing that printing plate on a horizontal conveyor track, said selective gripping means including a dish-shaped plate carried by said piston rod;
    means for accommodating swiveling movement of said lifting cylinder between said plate holder, which is disposed in an inclined receiving position with respect to a vertical direction, whereby in the inclined position of the plate holder the uppermost printing plate is gripped by said selective gripping means and a depositing position in which that printing plate is deposited on said horizontal conveyor track; and
    means for effecting movement through an angle of greater than 90° between said receiving position of said lifting cylinder and said depositing position.

2. A mechanism as claimed in claim 1, wherein said selective gripping means is a means for gripping by suction, retaining and depositing the uppermost printing plate on the horizontal conveyor track; and wherein said selective gripping means includes suction elements on said dish-shaped plate.

3. A mechanism as claimed in claim 1, wherein each printing plate includes an uncoated side; wherein said lifting cylinder, when in said receiving position, points to the uncoated side of the uppermost printing plate and is disposed generally perpendicularly to the uppermost printing plate which is arranged in the inclined plate holder; said dish-shaped plate extending in parallel relationship to the uncoated side of the uppermost printing plate when said lifting cylinder is in said receiving position; and wherein said dish-shaped plate may be placed on the printing plate to pick it up from the stack of plates.

4. A mechanism as claimed in claim 1; wherein each printing plate has a coated side opposite an uncoated side, the coated side including a photoconductive layer; and wherein each printing plate has a protective sheet on the coated side thereof to protect the coated side from damage; and wherein said air jet is disposed at an upper end of the plate holder, said air jet being so disposed as to direct a stream of air almost tangentially with respect to the photoconductive layer on the coated side of the uppermost printing plate as soon as the lifting cylinder picks up the uppermost printing plate from the stack; whereby the air jet contributes to detachment of the protective sheet from the coated side of the printing plate.

5. A mechanism as claimed in claims 3 or 4, wherein the horizontal conveyor cooperates with an exposure table to which printing plates are transported by rollers, the exposure table being disposed at a certain level which is vertically above the lifting cylinder at least when said lifting cylinder is in said receiving position, and wherein, in said depositing position of said lifting cylinder, the dish-shaped plate of said lifting cylinder extends horizontally, the coated side of that printing plate which is retained by the selective gripping means in an upward direction and the uncoated side of the printing plate is at the same level as the exposure table.

6. A mechanism as claimed in claim 5, wherein the horizontal conveyor track is located generally in a horizontal plane, wherein the rollers are grooved rollers and each printing plate includes opposite longitudinal edges, and wherein the grooved rollers are positioned in the plane of the conveyor track and engage by their grooves the opposite longitudinal edges of the printing plate during transport of the printing plate to the exposure table.

* * * * *